United States Patent
Lee

(10) Patent No.: US 9,473,811 B1
(45) Date of Patent: Oct. 18, 2016

(54) SYSTEMS AND METHODS FOR PROVIDING BROADCAST CONTENT VIA DISTRIBUTED KIOSKS

(71) Applicant: The DIRECTV Group, Inc., El Segundo, CA (US)

(72) Inventor: Sean S. Lee, Potomac, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/590,938

(22) Filed: Jan. 6, 2015

(51) Int. Cl.
| | |
|---|---|
| H04N 7/18 | (2006.01) |
| H04N 21/426 | (2011.01) |
| H04N 21/4363 | (2011.01) |
| H04N 21/61 | (2011.01) |
| H04N 21/436 | (2011.01) |
| H04N 21/41 | (2011.01) |

(52) U.S. Cl.
CPC ...... *H04N 21/4263* (2013.01); *H04N 21/4126* (2013.01); *H04N 21/42623* (2013.01); *H04N 21/43615* (2013.01); *H04N 21/43637* (2013.01); *H04N 21/6143* (2013.01)

(58) Field of Classification Search
CPC .............................................. H04N 21/41415
USPC ......................................................... 725/31
See application file for complete search history.

(56) References Cited

U.S. PATENT DOCUMENTS

| | | | | |
|---|---|---|---|---|
| 8,561,114 B2* | 10/2013 | Jeffs | ................... | H04N 7/17318 380/211 |
| 2005/0097595 A1* | 5/2005 | Lipsanen | ................ | G06F 21/10 725/25 |
| 2008/0109558 A1* | 5/2008 | Lee | ................... | G06F 17/30053 709/231 |
| 2010/0057563 A1* | 3/2010 | Rauber | ................. | G06Q 30/02 705/14.53 |
| 2013/0042270 A1* | 2/2013 | Bond | ................. | H04N 21/4305 725/40 |
| 2015/0143437 A1* | 5/2015 | Hybertson | ....... | H04N 21/44222 725/88 |
| 2015/0245109 A1* | 8/2015 | Couleaud | .......... | H04N 21/2146 725/77 |

\* cited by examiner

*Primary Examiner* — Junior Mendoza
(74) *Attorney, Agent, or Firm* — Harness, Dickey & Pierce, P.L.C.

(57) ABSTRACT

A system includes a kiosk that receives signals broadcast from a service provider and a wireless interface that receives, from a mobile device, a request for first content included in the signals received by the kiosk. The first content corresponds to a first channel. The kiosk includes a plurality of tuners. The kiosk tunes a first tuner of the plurality of tuners to the first channel and the first tuner outputs the first content. The kiosk provides the first content to the wireless interface. The wireless interface transmits the first content to the mobile device.

16 Claims, 12 Drawing Sheets

SYSTEMS AND METHODS FOR PROVIDING
BROADCAST CONTENT VIA DISTRIBUTED
KIOSKS

TECHNICAL FIELD

The present disclosure relates generally to content distribution systems and methods, and more particularly to content distribution systems and methods for providing broadcast content to a mobile device via one or more kiosks.

BACKGROUND

The statements in this section merely provide background information related to the present disclosure and may not constitute prior art.

A service provider may broadcast content to users via a user receiving device, such as a set top box. For example, the service provider may transmit the content to the user receiving device via satellite or other wireless or wired medium. The user receiving device demodulates and/or decodes the signal received from the service provider and outputs the decoded content to a display device to be viewed by the user. For example, the content may be displayed on a television in the home of the user.

Service providers may implement various mechanisms for providing access to content in a manner that is convenient to users. For example, users may access content via a distributed communications system such as the internet using a mobile device such as a smartphone or tablet computer. Content accessed via the internet typically corresponds to downloadable content stored at the service provider or other content provider.

SUMMARY

The present disclosure relates generally to a content distribution system for providing content from kiosks to one or more mobile devices. The kiosks receive content broadcast from a service provider and provide selected content in response to requests from the mobile devices.

In one aspect of the disclosure, a system includes a kiosk that receives signals broadcast from a service provider and a wireless interface that receives, from a mobile device, a request for first content included in the signals received by the kiosk. The first content corresponds to a first channel. The kiosk includes a plurality of tuners. The kiosk tunes a first tuner of the plurality of tuners to the first channel and the first tuner outputs the first content. The kiosk provides the first content to the wireless interface. The wireless interface transmits the first content to the mobile device.

In a further aspect of the disclosure, a method includes receiving, at a kiosk, signals broadcast from a service provider, receiving, from a mobile device, a request for first content included in the signals received by the kiosk, wherein the first content corresponds to a first channel, tuning a first tuner of a plurality of tuners of the kiosk to the first channel, outputting the first content from the tuner, and transmitting the first content from the kiosk to the mobile device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 6A:
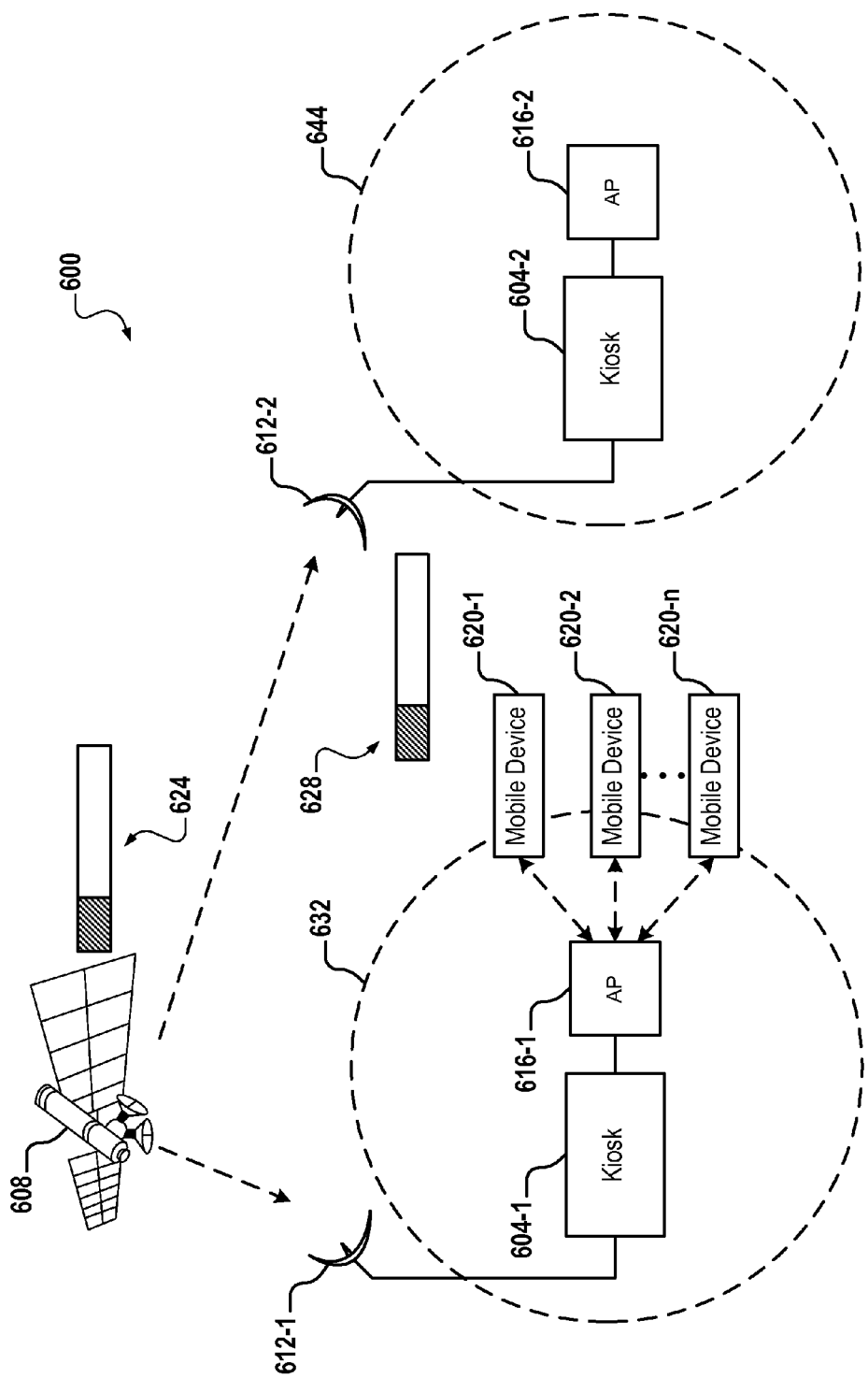
Figure 6B:
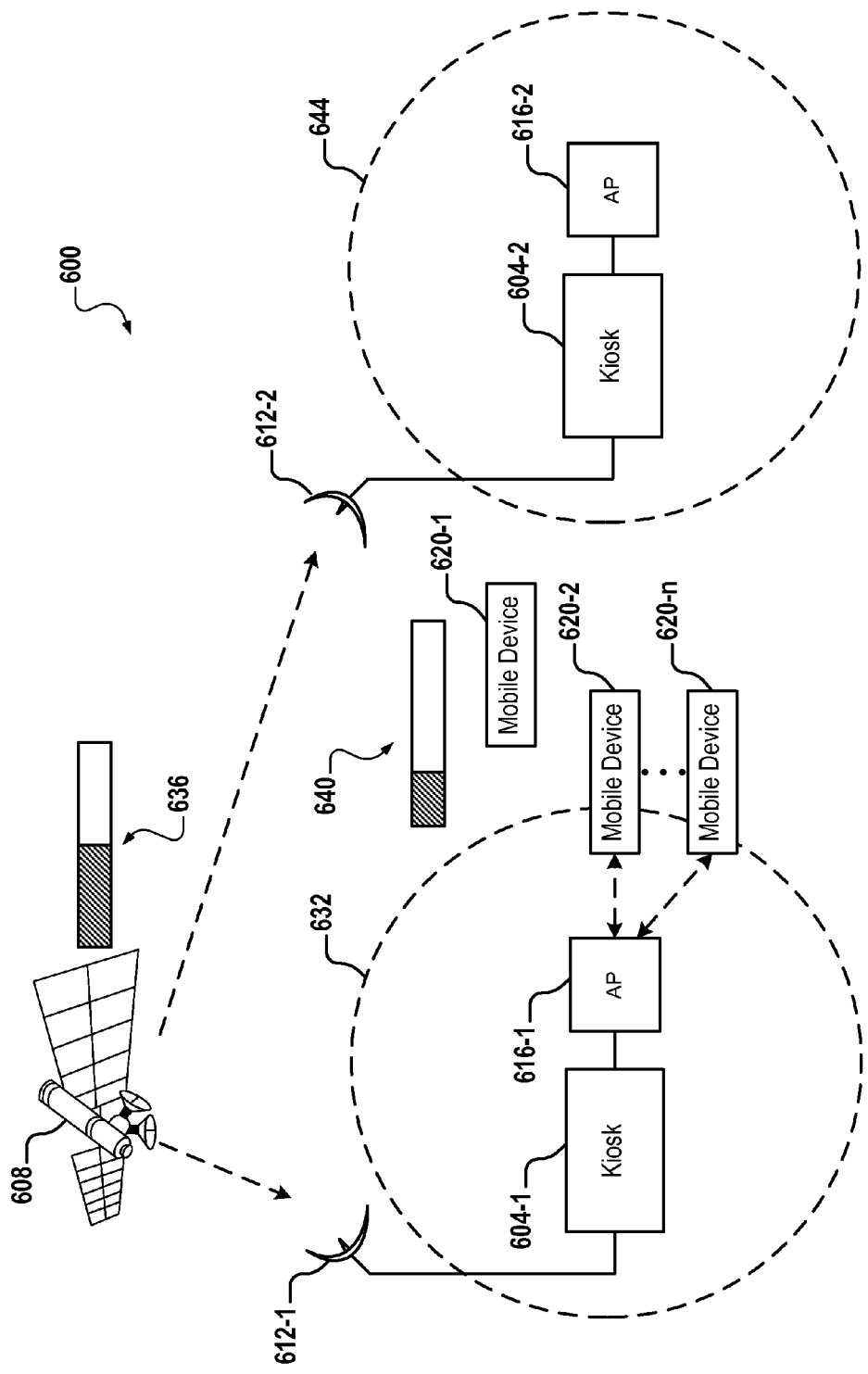
Figure 6C:
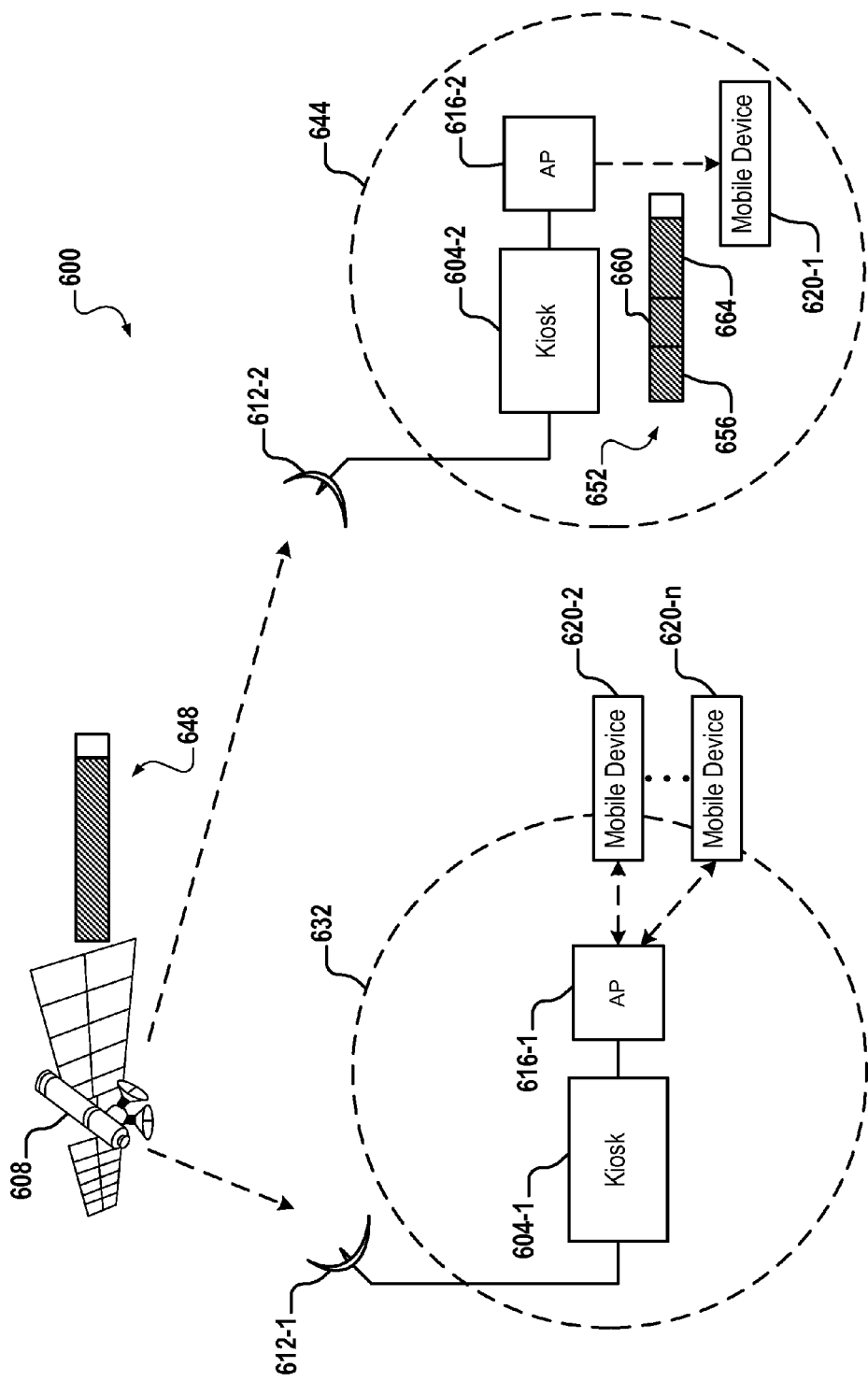

FIGS. 6A, 6B, and 6C are block diagrammatic views of illustrating transmission of content from multiple kiosks in a content distribution system to a mobile device according to one example of the present disclosure.

Figure 7:
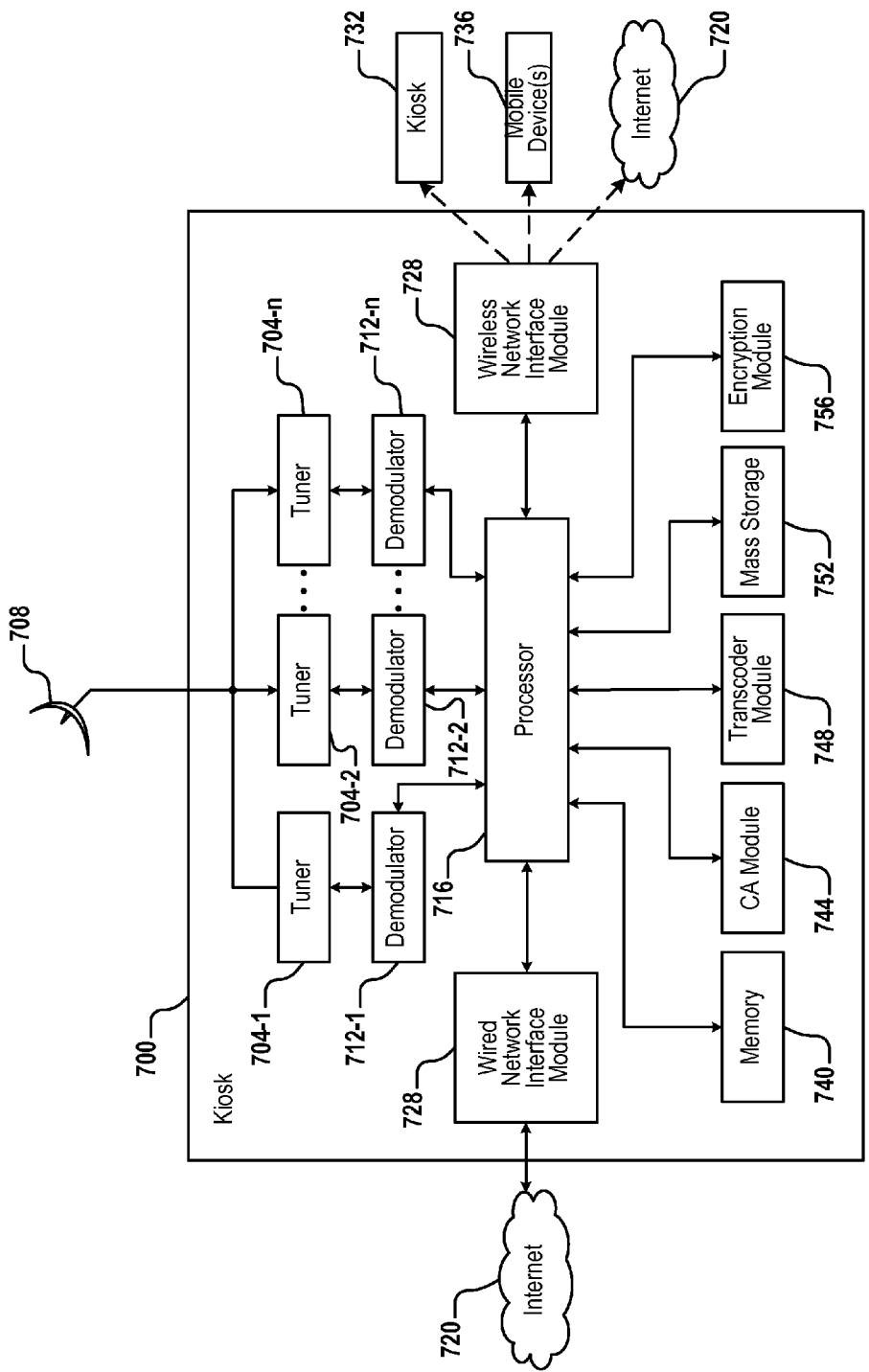

FIG. 7 is a block diagrammatic view of a kiosk according to one example of the present disclosure.

Figure 8:
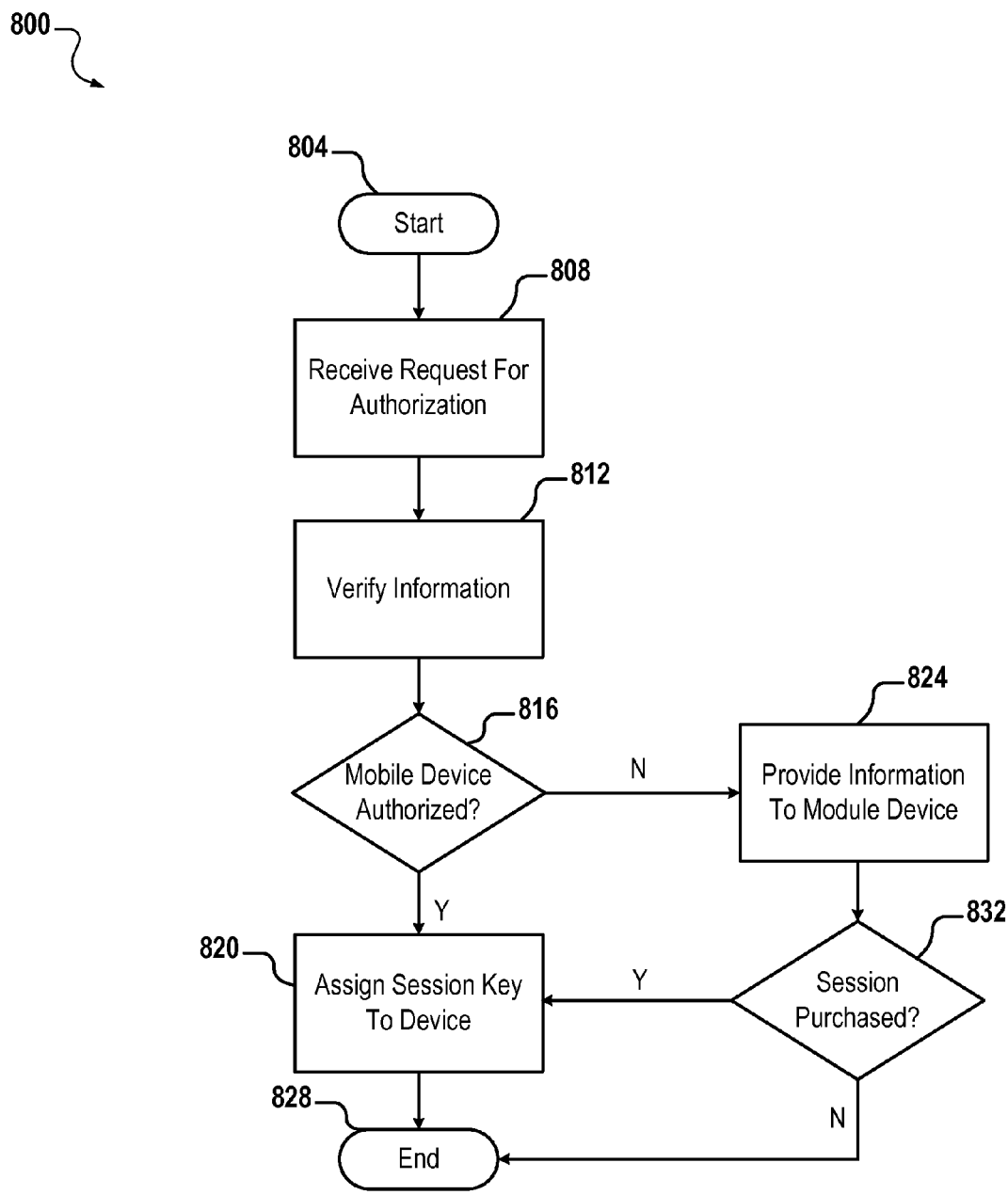

FIG. 8 is a flowchart that illustrates steps of an authentication method according to one example of the present disclosure.

Figure 9:
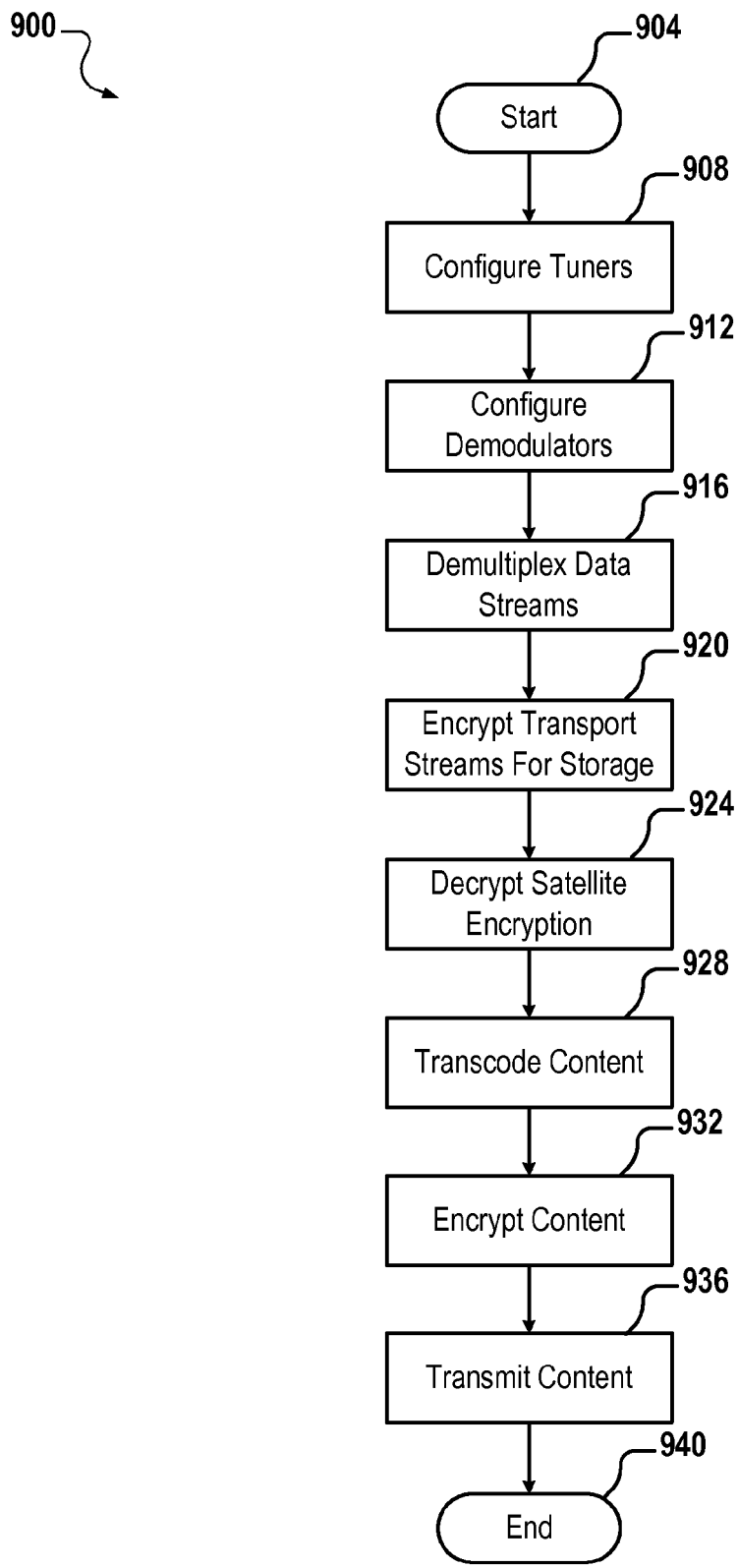

FIG. 9 is a flowchart that illustrates steps of a content distribution method according to one example of the present disclosure.

Figure 10:
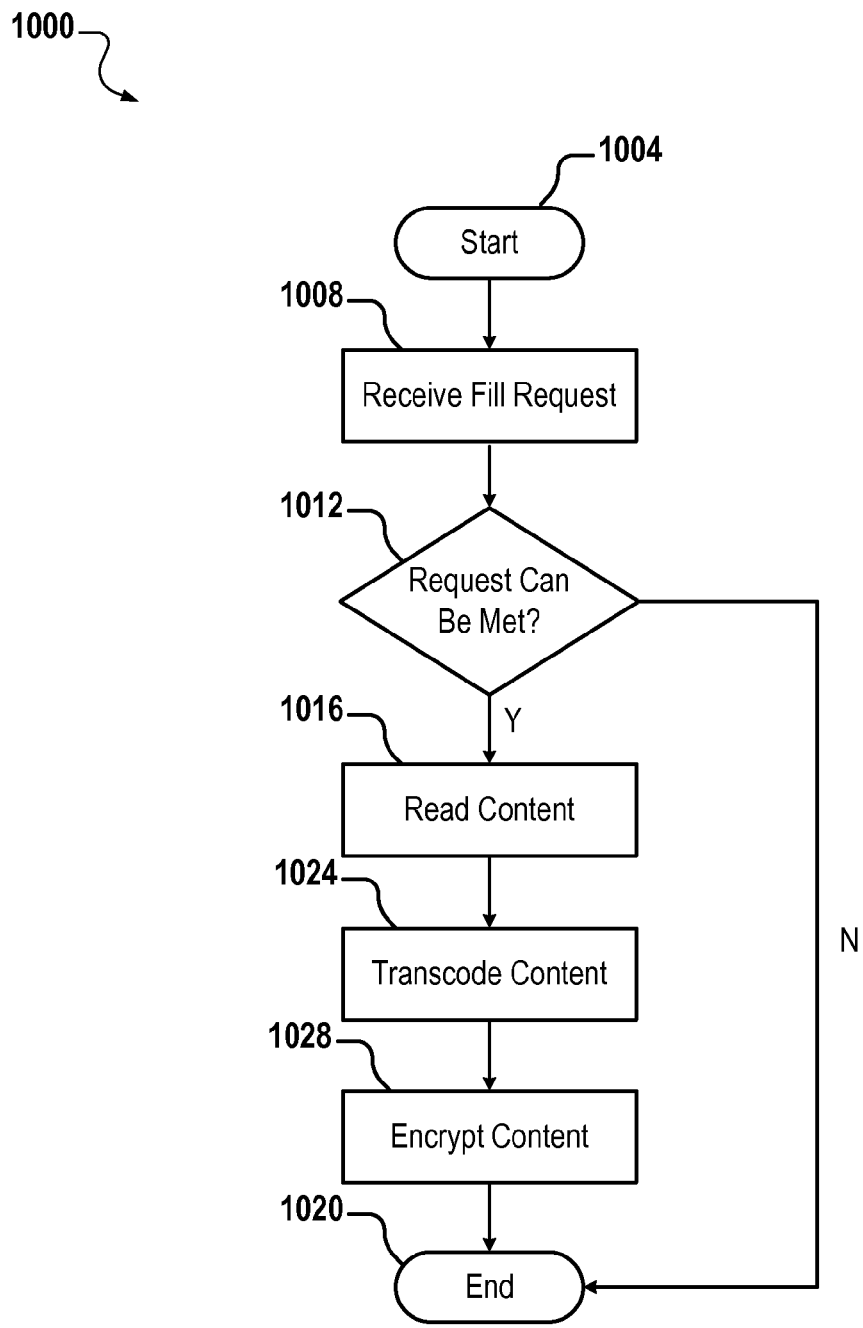

FIG. 10 illustrates steps of a fill request method according to one example of the present disclosure.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Typically, when a user is a subscriber of a service provider, the service provider provides content to the user via a user receiving device in a home of the user. The user may also access content outside of the home using a connection to a distributed communication system such as the internet. For example, the user may use a mobile device having a wireless data connection to an access point. However, the content available to the user outside of the home may be different from the content available and broadcast to the user receiving device inside the home.

For example, the content broadcast to the user receiving device may include live content (e.g., televised sporting events, content broadcast at a specific time, etc. as broadcast by a satellite or other broadcast mechanism). Conversely, the content accessed by the user outside of the home using a mobile device may correspond to downloadable content. In other words, the content accessed outside of the home is not "live."

Distribution systems and methods according to the principles of the present disclosure allow users to access live content broadcast by a service provider using a mobile device. One or more distributed kiosks are configured to receive content broadcast from a service provider. For example, the one or more kiosks may be provided within a home or in an apartment complex, a hotel, a hospital, an airport, and/or in vehicles such as planes, trains, and ships.

Each kiosk includes a satellite receiver for receiving the broadcast content and one or more user receiving devices for demodulating and decoding the content and providing the content to mobile devices. Alternatively, a single satellite may receive the broadcast content and provide the content to multiple receivers of respective kiosks. Further, although described with respect to satellite broadcast, the principles of the present disclosure may be used with other broadcast systems, such as content broadcast from a distributed communications system such as the internet, a wired cable service provider, a cellular network, etc.

Each kiosk may provide the content to a plurality of mobile devices. For example, a user of a first mobile device may view first content (e.g., on a first channel) using the kiosk while a user of a second mobile device may view second content (e.g., on a second channel) using the kiosk. In other words, a plurality of users may view different live content using the same kiosk.

Further, communication with the mobile device may be handed off between kiosks as the user moves out of the range of a first kiosk and within range of a second kiosk. In this manner, the user may continue to view the broadcast content while moving between locations and/or in the event that communication with one of the kiosks is otherwise interrupted.

Figure 1:
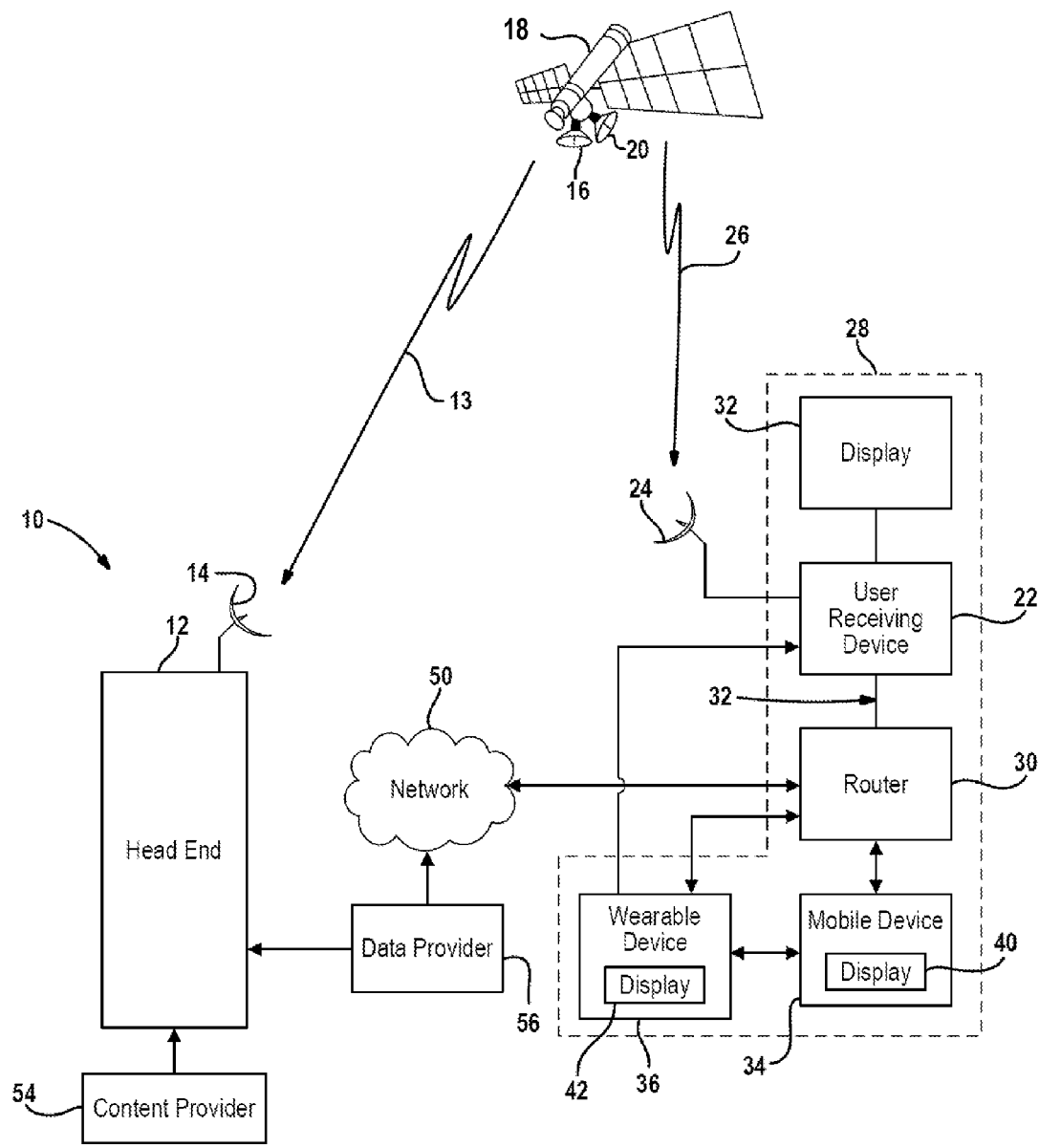
FIG. 1 is a block diagrammatic view of a communication system according to one example of the present disclosure.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals 26 that are directed to a user receiving device 22. The user receiving device 22 may be located within a building 28 such as a home, multi-unit dwelling or business. The user receiving device 22 is in communication with an antenna 24. The antenna 24 receives downlink signals 26 from the transmitting antenna 20 of the satellite 18. Thus, the user receiving device 22 may be referred to as a satellite television receiving device. However, the system has applicability in non-satellite applications such as a wired or wireless terrestrial system. Therefore the user receiving device 22 may be referred to as a television receiving device or set top box. More than one user receiving device 22 may be included within a system or within a building 28. The user receiving devices 22 may be interconnected.

The user receiving device 22 may be in communications with a router 30 that forms a local area network 32 with a mobile device 34 and a wearable device 36. The router 30 may be a wireless router or a wired router or a combination of the two. For example, the user receiving device 22 may be wired to the router 30 and wirelessly coupled to the mobile device 34 and to the wearable device 36. The router 30 may communicate internet protocol (IP) signals to the user receiving device 22. The IP signals may be used for controlling various functions of the user receiving device 22. IP signals may also originate from the user receiving device 22 for communication to other devices such as the mobile device 34 or the wearable device 36 through the router 30. The mobile device 34 and the wearable device 36 may also communicate signals to the user receiving device 22 through the router 30.

The mobile device 34 may be a mobile phone, tablet computer, laptop computer or any other type of computing device.

The wearable device 36 may be one of a number of types of wearable devices that are worn by a user. The wearable device 36 may be fixed wearable by a user meaning it is meant to be fixed to the user. Examples of wearable devices 36 include a computerized watch such as a Samsung® or Apple® watch. The watch devices are fixed to an arm of the user. Another example of a wearable device 36 is GOOGLE GLASS® which is fixed to a head of a user. Of course, other types of wearable devices affixed to other parts of the body may be used. The wearable device 36 may be in direct communication with the user receiving device 22 and the mobile device 34 through a Bluetooth® connection. The wearable device 36 may also be in communication with the user receiving device 22 and the mobile device 34 through an IP connection through the router 30. The wearable device 36 may also be in communication with devices outside the local area network 32 through the router 30. That is, the wearable device 36 may communicate with other devices such as the head end 12 through the network 50. The wearable device 36 may also be in communication with the mobile device 34 which provides a bridge or a communication path to the router 30 and ultimately to the user receiving device 22 or the network 50. The wearable device 36 may generate signals such as selection signals that are communicated through the mobile device 34 but are destined to be used by the user receiving device 22, the head end 12 or other user devices in communication with the network 50.

The wearable device 36 may be in communication with the mobile device 34 by way of a Bluetooth® connection. The mobile device 34 may in turn be in communication with the router 30 and various other devices, such as the user receiving device 22 or devices through the network 50 such as the head end 12 or other devices in other parts of the network.

The user receiving device 22 includes a screen display 38 associated therewith. The display 38 may be a television or other type of monitor. The display 38 may display both video signals and audio signals.

The mobile device 34 may also have a display 40 associated therewith. The display 40 may also display video and audio signals. The display 40 may be integrated into the mobile device. The display 40 may also be a touch screen that acts as at least one user interface. Other types of user interfaces on the mobile devices may include buttons and switches.

The wearable device 36 may also have a display 42 associated therewith. The display 42 may also display video and audio signals. The display 42 may be integrated into the wearable device 36. A projected display or user interface may also be projected on a surface adjacent to the eye of a user. The display 42 may also be a touch screen that acts as at least one user interface such as in a wearable watch type device. The device 36 may display function selectors or "buttons" that are other types of user interfaces on the wearable devices may include buttons and switches.

The user receiving device 22 may be in communication with the head end 12 through an external network or simply, network 50. The network 50 may be one type of network or multiple types of networks. The network 50 may, for example, be a public switched telephone network, the internet, a mobile telephone network or other type of network. The network 50 may be in communication with the user receiving device 22 through the router 30. The network 50 may also be in communication with the mobile device 34 through the router 30. Of course, the network 50 may be in direct communication with the mobile device 34 or wearable device 36 such as in a cellular system.

The system 10 may also include a content provider 54 that provides content to the head end 12. Although only one content provider 54 is illustrated, more than one content provider may be used. The head end 12 is used for distributing the content through the satellite 18 or the network 50 to the user receiving device 22, mobile device 34 or the wearable device 36.

A data provider 56 may also provide data to the head end 12. The data provider 56 may provide various types of data such as schedule data or metadata that is provided within the program guide system. The metadata may include various descriptions, actor, director, star ratings, titles, user ratings, television or motion picture parental guidance ratings, descriptions, related descriptions and various other types of data. The data provider 56 may provide the data directly to the head end and may also provide data to various devices such as the mobile device 34, wearable device 36, and the user receiving device 22 through the network 50. This may be performed in a direct manner through the network 50.

Figure 2:
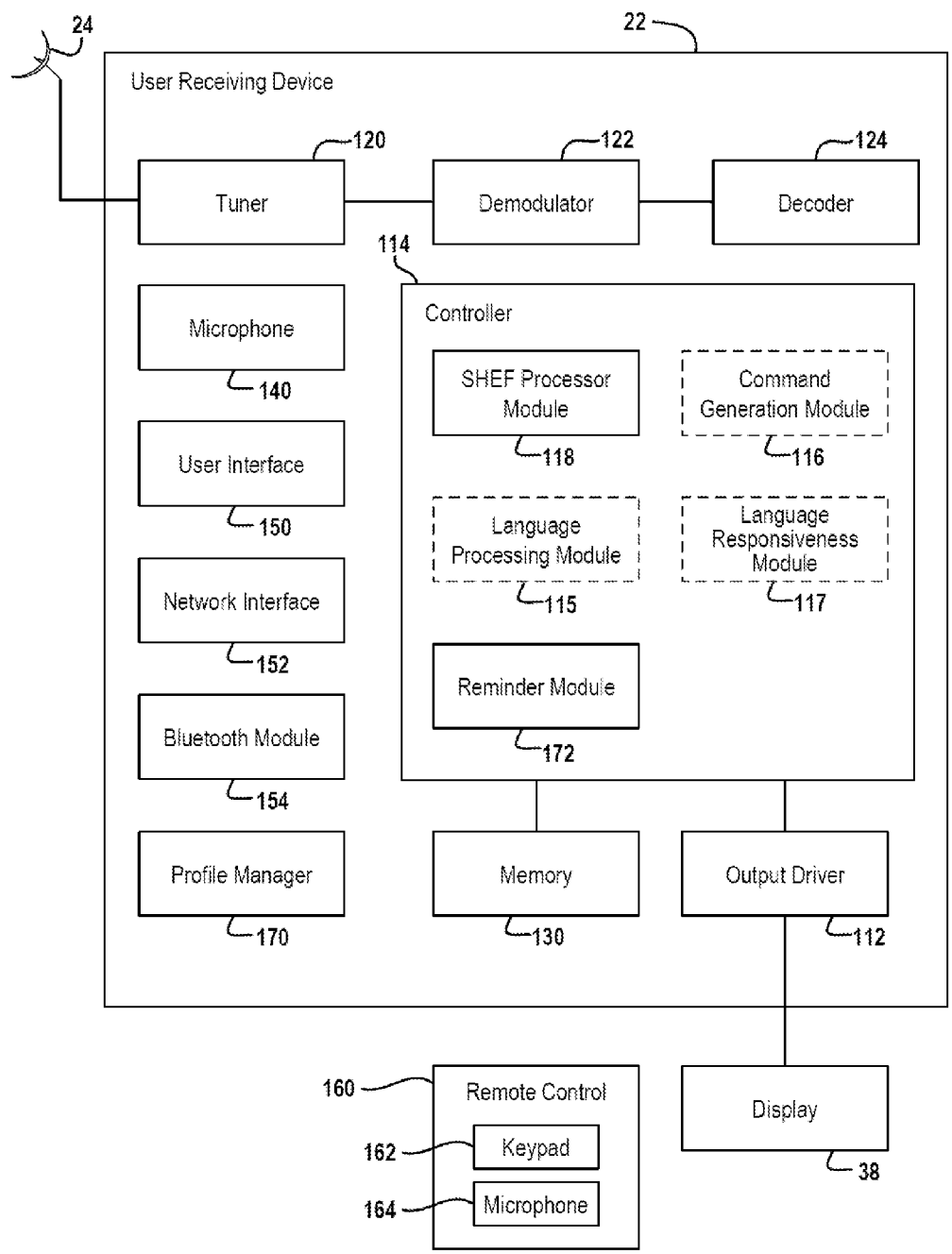
FIG. 2 is a block diagrammatic view of a user receiving device according to one example of the present disclosure.

Referring now to FIG. 2, a user receiving device 22, such as a set top box is illustrated in further detail. Although, a particular configuration of the user receiving device 22 is illustrated, it is merely representative of various electronic devices with an internal controller used as a content receiving device. Each of the components illustrated may be capable of communicating therebetween even though a physical line is not drawn.

The antenna 24 may be one of a number of different types of antennas that includes one or more low noise blocks. The antenna 24 may be a single antenna 24 used for satellite television reception. The user receiving device 22 is in communication with the display 38. The display 110 may have an output driver 112 within the user receiving device 22.

A controller 114 may be a general processor such as a microprocessor that cooperates with control software. The controller 114 may be used to coordinate and control the various functions of the user receiving device 22. These functions may include a tuner 120, a demodulator 122, a decoder 124 such as a forward error correction decoder, a buffer or other functions. The controller 114 may also be used to control various function of the user receiving device 22.

The controller 114 may also include one or more of a language processing module 115, a command generation module 116, a language responsiveness module 117 and a set top box HTTP export functionality (SHEF) processor module 118. Each of these modules is an optional feature of the user receiving device 22. As will be described below the functions associated with each of the modules 115-118 may be performed in the user receiving device or one of the other devices such as the head end or the mobile device or a combination of the three. The modules 115-118 may be located remotely from each other and may also be standalone devices or vendors on the network 50. In general, the language processing module 115 converts electrical signals that correspond to audible signals into a textual format or textual signal. The command generation module 116 determines a user receiving device control command that corresponds with the textual signal. The language responsiveness module 117 is used to train the system to recognize various commands.

The SHEF processor module 118 is used to receive SHEF commands and translate the SHEF commands into actual control signals within the user receiving device. Various types of SHEF commands for controlling various aspects of the user receiving device may be performed. The SHEF processor module 118 translates the hypertext transfer protocol signals received through the network into control signals within the user receiving device 22.

The tuner 120 receives the signal or data from the individual channel. The tuner 120 may receive television programming content, program guide data or other types of data. The demodulator 122 demodulates the signal or data to form a demodulated signal or data. The decoder 124 decodes the demodulated signal to form decoded data or a decoded signal. The controller 114 may be similar to that found in current DIRECTV® set top boxes which uses a chip-based multifunctional controller. Although only one tuner 120, one demodulator 122 and one decoder 124 are illustrated, multiple tuners, demodulators and decoders may be provided within a single user receiving device 22.

The controller 114 is in communication with a memory 130. The memory 130 is illustrated as a single box with multiple boxes therein. The memory 130 may actually be a plurality of different types of memory including the hard drive, a flash drive and various other types of memory. The different boxes represented in the memory 130 may be other types of memory or sections of different types of memory. The memory 130 may be non-volatile memory or volatile memory.

The memory 130 may include storage for content data and various operational data collected during operation of the user receiving device 22. The memory 130 may also include advanced program guide (APG) data. The program guide data may include various amounts of data including two or more weeks of program guide data. The program guide data may be communicated in various manners including through the satellite 18 of FIG. 1. The program guide data may include a content or program identifiers, and various data objects corresponding thereto. The program guide may include program characteristics for each program content. The program characteristic may include ratings, categories, actor, director, writer, content identifier and producer data. The data may also include various user profiles such as other settings like parental controls.

The memory 130 may also include a digital video recorder. The digital video recorder 132 may be a hard drive, flash drive, or other memory device. A record of the content stored in the digital video recorder 132 is a playlist. The playlist may be stored in the DVR 132 or a separate memory as illustrated.

The user receiving device 22 may include a voice converter such as a microphone 140 in communication with the controller 114. The microphone 140 receives audible signals and converts the audible signals into corresponding electrical signals. Typically, this is done through the use of a transducer or the like. The electrical signal corresponding to the audible may be communicated to the controller 114. The microphone 140 is an optional feature and may not be included in some examples as will be described in detail below. The electrical signal may also be process in a remotely located language processing module. Thus, the controller 114 may convert the electrical signal into a ".wav" file or other suitable file type suitable for communication through a network 50.

The user receiving device 22 may also include a user interface 150. The user interface 150 may be various types or combinations of various types of user interfaces such as but not limited to a keyboard, push buttons, a touch screen or a remote control. The user interface 150 may be used to select a channel, select various information, change the volume, change the display appearance, or other functions. The user interface 150 may be used for generating a selection signal for selecting content or data on the display 40.

A network interface 152 may be included within the user receiving device 22 to communicate various data through the network 50 illustrated above. The network interface 152 may be a WiFi, WiMax, WiMax mobile, wireless, cellular, or other types of communication systems. The network interface 152 may use various protocols for communication therethrough including, but not limited to, hypertext transfer protocol (HTTP).

A Bluetooth® module 154 may send and receive Bluetooth® signals to or from the mobile device or wearable device.

A remote control device 160 may be used as a user interface for communicating control signals to the user receiving device 22. The remote control device may include a keypad 162 for generating key signals that are communicated to the user receiving device 22. The remote control device may also include a microphone 164 used for receiving an audible signal and converting the audible signal to an electrical signal. The electrical signal may be communicated to the user receiving device 22.

The user receiving device 22 may also include a profile manager 170. The profile manager 170 may use various profiles for operating and generating displays of the user receiving device. For example, the user receiving device 22 may have various users associated therewith. Each user may have a user data such as a profile that is used to operate the device to provide a customized user experience. The profiles may be used to set various operations of the user receiving device 22 such as, but not limited to, a list of favorite channels, a list of operational settings of the user receiving device, a recorded program playlist, and recommendation characteristics. The recommendation characteristics may be stored while the user is associated with the user receiving device by tuning or recording various programming. User profiles may be changed in response to the user's actions at the user receiving device 22. The user settings may be established for the language, the parental controls, and other user established settings. By storing any user established settings or adjustments, a profile can easily configure the user receiving device and provide a consistent user experience without the user having to provide inputs by scrolling through various menus at each television watching experience.

The profile manager module 170 may receive the various user data or profiles that are stored within the memory 130. The user profiles may also be stored within the head end and communicated to the user receiving device. A new user may have a user profile or user data communicated from the head end or always communicated from the head end when the user is identified to the user receiving device. As will be mentioned below, the user may be identified to the user receiving device 22 through a user identifier such as a numerical code, a user name, or an identifier associated with a mobile or wearable user receiving device.

A reminder module 172 may also be included within the controller of the user receiving device 22. The reminder module 172 may be associated with a time clock or other device for generating a reminder set by a user. The reminder module 172 may generate a screen display on the display 38 or generate a signal communicated to the wearable device 36 that corresponds to a reminder and provides various choices, such as record or tune, to the user.

Figure 3:
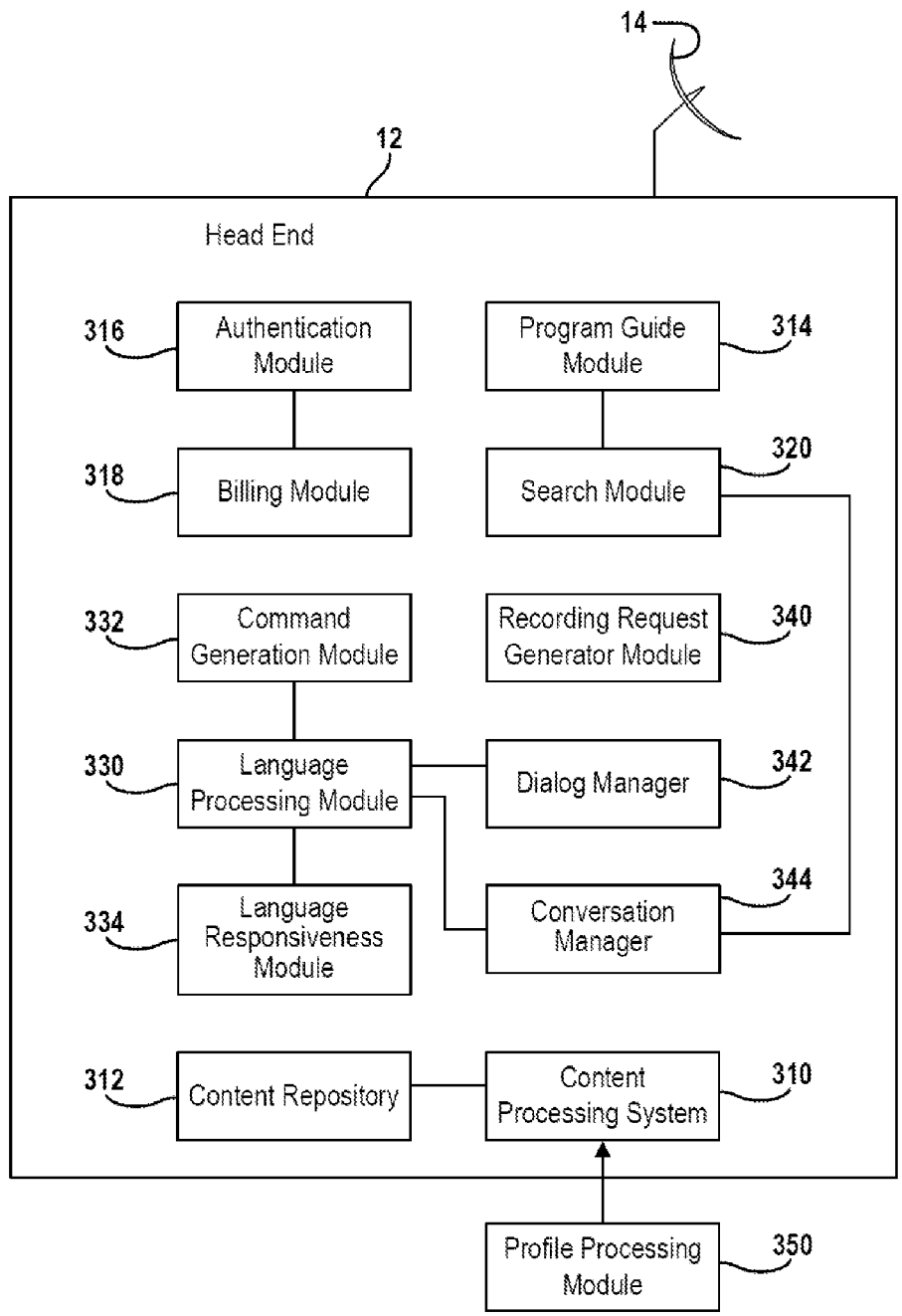
FIG. 3 is a block diagrammatic view of a head end according to one example of the present disclosure.

Referring now to FIG. 3, the head end 12 is illustrated in further detail. The head end 12 may include various modules for intercommunicating with the mobile device 34 and the user receiving device 22 illustrated in FIG. 1. Only a limited number of interconnections of the modules are illustrated in the head end 12 for drawing simplicity. Other interconnections may, of course, be present in a constructed example.

The head end 12 receives content from the content provider 54 illustrated in FIG. 1. A content processing 310 processes the content for communication through the satellite 18. The content processing system 310 may communicate live content as well as recorded content. The content processing system 310 may be coupled to a content repository 312 for storing content therein. The content repository 312 may store and process On-Demand or Pay-Per-View content for distribution at various times. The Pay-Per-View content may be broadcasted in a linear fashion (at a predetermined time according to a predetermined schedule). Linear content is presently broadcasting and may also be scheduled in the future. The content repository 312 may also store On-Demand content therein. On-Demand content is content that is broadcasted at the request of a user receiving device and may occur at any time (not on a predetermined schedule). On-Demand content is referred to as non-linear content.

The head end 12 also includes a program guide module 314. The program guide module 314 communicates program guide data to the user receiving device 22 illustrated in FIG. 1. The program guide module 314 may create various objects that are communicated with various types of data therein. The program guide module 314 may, for example, include schedule data, various types of descriptions for the content and content identifier that uniquely identifies each content item. The program guide module 314, in a typical system, communicates up to two weeks of advanced guide data for linear content to the user receiving devices. The guide data includes tuning data such as time of broadcast, end time, channel, and transponder to name a few. Guide data may also include content available on-demand and pay-per-view content An authentication module 316 may be used to authenticate various user receiving devices, mobile devices and wearable devices that communicate with the head end 12. The authentication module 316 may be in communication with a billing module 318. The billing module 318 may provide data as to subscriptions and various authorizations suitable for the user receiving devices, the mobile devices and wearable devices that interact with the head end 12. The authentication module 316 ultimately permits the user receiving devices and mobile devices to communicate with the head end 12. Authentication may be performed by providing a user identifier, a password, a user device identifier or combinations thereof.

A search module 320 may also be included within the head end 12. The search module 320 may receive a search query comprising one or more search terms from various devices such as a mobile device or user receiving device. The search module 320 may communicate search results to one of the user receiving device or the mobile device. The search module 320 may interface with the program guide module 314 or the content processing system 310 or both to determine search result data. The search results may be personalized according to personal profiles, user data and viewing habits.

The head end 12 may also include a language processing module 330. The language processing module 330 may be used to generate text signals from electrical signals that correspond to audible signals received through the network 50 from a mobile device 34 or user receiving device 22 illustrated in FIG. 1. The language processing module 330 may also be or include a voice converter. The language processing module 330 may communicate the text signals to a command generation module 332. The command generation module 332 generates a user receiving device control command that corresponds to the textual signal generated by the language processing module 330. The command generation module may include various variations that correspond to a particular command. That is, people speak in various ways throughout the country and various regions. Accents and other language anomalies may be taken into consideration within the command generation module 332. Details of this will be described further below.

The head end 12 may also include a language responsiveness module 334 that is used to improve the responsiveness of the language processing module 330 and the command generation module 332. The language responsiveness module 334 is a learning mechanism used to recognize various synonyms for various commands and associate various synonyms with various commands. The details of the language responsiveness module 334 will be described in greater detail below.

The head end 12 may also include a recording request generator module 340. Various signals may be communicated from a mobile device 34 illustrated in FIG. 1 or another networked type computing device. A request to generate a recording may be communicated to the head end 12 and ultimately communicated to the user receiving device 22. The recording request may include a user receiving device identifier and a time to initiate recording. Other data that may be included in the recording request may include a channel, a transponder, a start time, an end time, a content delivery network identifier such as an IP address and various other types of identifiers that allow the user receiving device 22 to tune and record the desired content.

The head end 12 may also include a dialog manager 342. The dialog manager 342 is used to generate a corrected text response such as a sentence in response to a search request. The corrected text response may be a grammatically corrected text response. The grammatically correct text response may be based on a classification that is derived from the received text of the original audible signal. The grammatically correct text response may also be provided in a voice signal that may be played back at the receiving device. An audible signal may be useful in a mobile device where text may not easily be reviewed without being distracted from other tasks. As will be described below, templates may be used in the dialog manager based upon identified data from the original audible request. The output of the dialog manager 342, because of the grammatical correctness, may be easily be read and understood by the user of the device to which the results are returned.

The head end 12 may also include a conversation manager 344. The conversation manager is used to determine whether a second search request is related to a previous first search request. As will be mentioned in detail below, the conversation manager 344 determines whether intents or mentions within the search request are related. The conversation manager starts a new context when the second search is not related to the first search.

The head end 12 may include a profile processing module 350. The profile processing module 350 may receive a user identifier, a device identifier or both to identify a user. The user experience of a wearable device or a set top box may be changed based upon the characteristics of a user. The profile processing module 350 may provide user characteristics to a set top box or other user receiving device 22 through the network. The profile processing module may store various types of data, including a favorite channel list, a playlist and parental settings. The profile processing module 350 may also store identifiers corresponding to content watched so that recommendations may be provided to the user. As content is watched, the content identifier and the user identifier may be communicated to the head end and stored therein. Recommendations may thus be generated for a particular user that corresponds to content of interest to the user. The head end 12 may thus store profile data or user data for all of the system users so that it may be distributed to various devices when necessary.

The search module 320, language processing module 330, the command generation module 332, the language responsiveness module 334, the dialog manager 342, the conversation manager 344 and the profile processing module 350 are illustrated by way of example for convenience within the head end 12. As those skilled in the art will recognize, these modules 320-350 may also be located in various other locations together or remote to/from each other including outside the head end 12. The network 50 may be used to communicate with modules 320-350 located outside the head end 12.

A content delivery network 352 may be in communication with a content repository 312. The content delivery network 352 is illustrated outside of the head end 12. However, the content delivery network 352 may also be included within the head end 12. The content delivery network 352 may be managed or operated by operators other than the operators of the head end 12. The content delivery network 352 may be responsible for communicating content to the various devices outside of the head end 12.

Figure 4:
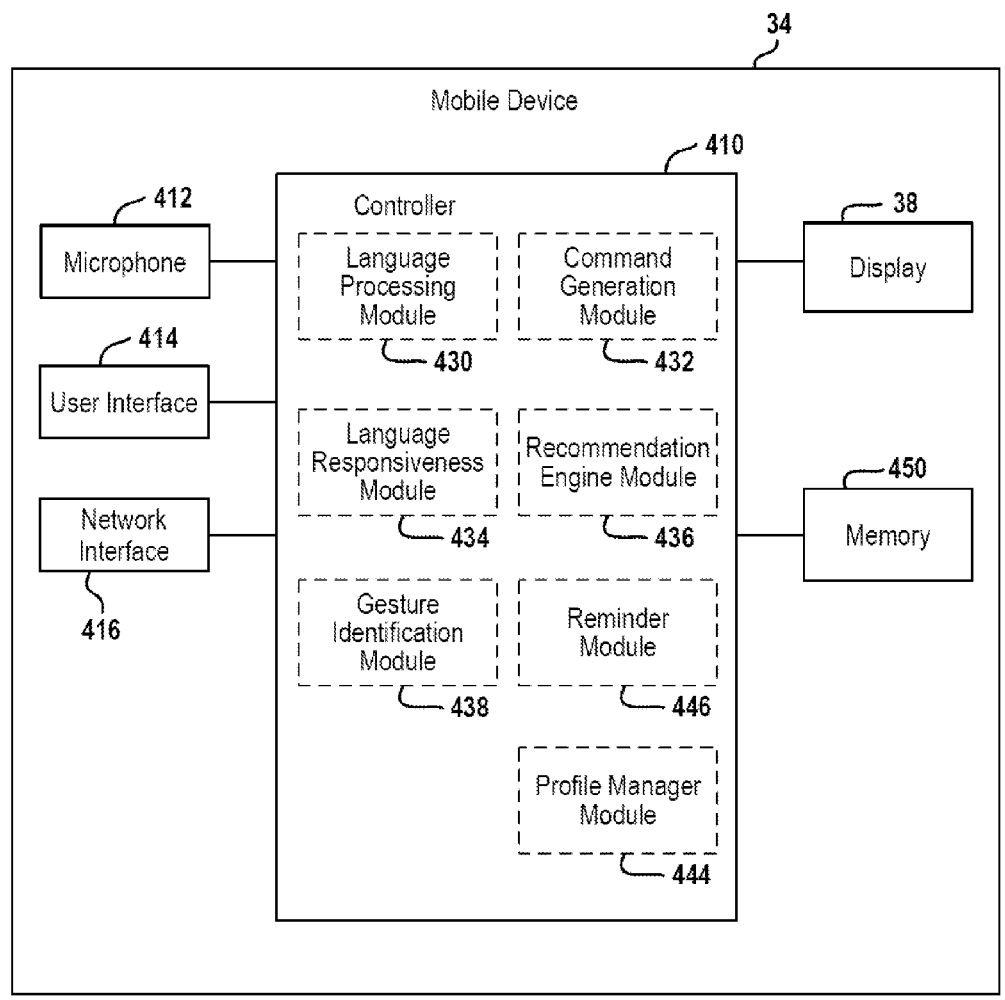
FIG. 4 is a block diagrammatic view of a mobile device according to one example of the present disclosure.

Referring now to FIG. 4, the mobile device 34 is illustrated in further detail. The mobile device 34 includes a controller 410 that controls the various functions therein. The controller 410 is in communication with a microphone 412 that receives audible signals and converts the audible signals into electrical signals. The audible signals may include a request signal. The request signal may be to perform a search, obtain guide data network data or playlist data.

The controller 410 is also in communication with a user interface 414. The user interface 414 may be buttons, input switches or a touch screen.

A network interface 416 is also in communication with the controller 410. The network interface 416 may be used to interface with the network 50. As mentioned above, the network 50 may be a wireless network or the internet. The network interface 416 may communicate with a cellular system or with the internet or both. A network identifier may be attached to or associated with each communication from the mobile device so that a determination may be made by another device as to whether the mobile device and the user receiving device are in the same local area network.

The controller 410 may also be in communication with the display 40 described above in FIG. 1.

The controller 410 may also include a language processing module 430, a command generation module 432 and a language processing module 434. Modules 430, 432 and 434 are optional components. That is, command generation and language responsiveness may be performed in remote locations such as external to the mobile device. Each of the head end 12, the user receiving device 22 or the mobile device 34 may optionally include one or more language processing module, command generation module or language responsiveness module. Also, as mentioned above, none of the devices may include the modules. Rather, the modules may be interconnected with the network 50 without residing in the head end, the user receiving device or the mobile device. Variations of this will be provided in the example set forth below.

A recommendation engine 436 may also be included within the controller 410. The recommendation engine 436 may have various data that is stored in a memory 450 of the mobile device 34. For example, selected content, content for which further data was sought, and recorded content may all be stored within the memory 450. The recommendation engine 436 may provide recommendations obtained whose content data or metadata has been obtained from the head end 12. The recommendations may be tailored to the interests of the user of the mobile device. The recommendation engine 436 may communicate the data such as the selected content, the content for which data was sought, the recorded content and the like to the head end and, in particular, the profile processing module 350.

The controller 410 may also include a gesture identification module 438 that identifies gestures performed on the display 38. For example, the gestures may be a move of dragging the user's finger up, down, sideways or holding in a location for a predetermined amount of time. A gesture performed at a certain screen may be translated into a particular command.

A profile manager 444 may store user profile data within the mobile device. The profile manager 444 may store user settings, such as favorites and parental controls. The profile manager 444 may also save relative to the recommendation engine 436 for each individual user of the mobile device. The profile manager 444 may also receive profile data from the profile processing module 350 of the head end 12 through the network.

A reminder module 446 may also be included within the controller 410 of the mobile device 34. The reminder module 446 may be associated with a time clock or other device for generating a reminder set by a user. The reminder module 446 may generate a screen display on the display 38 that corresponds to a reminder and provides various choices, such as record or tune, to the user.

Figure 5:
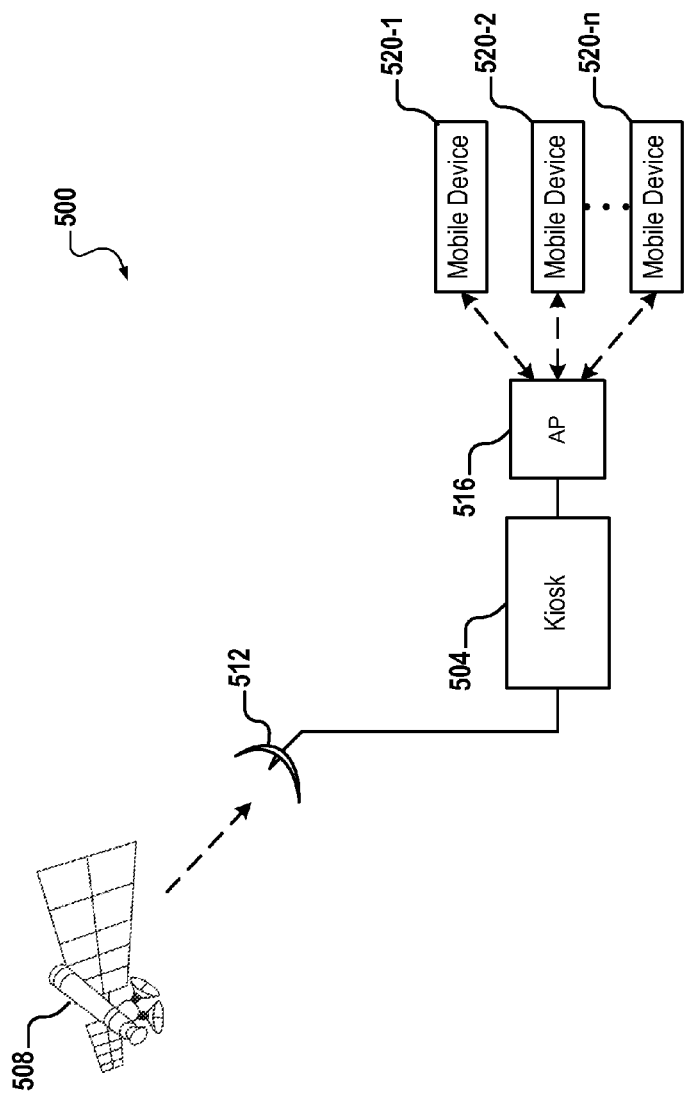
FIG. 5 is a block diagrammatic view of a content distribution system according to one example of the present disclosure.

Referring now to FIG. 5, an example content distribution system 500 according to the principles of the present disclosure includes one or more kiosks 504 that receive content broadcast by a satellite 508. For example, the kiosk 504 is in communication with an antenna 512 that receives wireless signals including the content and provides the signals, which may include audio and video data, to the kiosk 504 via a wired connection. Although shown in the example system 500 as receiving the signals via wireless communication with the satellite 508, the kiosk 504 may alternatively or additionally include a wired or wireless cable or internet connection for receiving the signals including the broadcast content.

The kiosk 504 performs functions similar to the user receiving device 22 as described in FIG. 2. For example, the kiosk 504 includes structure analogous to the tuner 120, the demodulator 122, and/or the decoder 124 for providing a signal from a selected channel, demodulating the signal, and decoding the signal, respectively. The kiosk 504 may also include structure for encrypting and/or decrypting the content. The kiosk 504 in the example embodiment of FIG. 5 may include a plurality of tuners, demodulators, and decoders for providing content received on different channels to different mobile devices. The kiosk 504 may also receive non-linear data via the satellite 508 (e.g., audio and/or video data that is sent as files that are re-assembled by the kiosk 504 and transmitted to the mobile devices upon request). In embodiments, the kiosk 504 includes mass storage for storing live broadcast content and/or non-linear data. Accordingly, the stored broadcast content can be provided, upon request, to mobile devices at any time subsequent to being stored by the kiosk. For example, a user may request content broadcast to and stored by the kiosk at any previous time (e.g., live broadcast content stored hours, days, etc. prior to being requested by the user).

In embodiments, the kiosk 504 may be configured to transcode the audio and video data to be transmitted wirelessly to the mobile devices. Accordingly, the kiosk 504 would be configured to transcode the audio and video data to be optimized for a particular mobile device. For example, if the live content broadcast from the satellite 508 and received by the kiosk 504 is in a 1080p or other high definition resolution, the kiosk 504 may transcode the content into a format more suitable for a particular mobile device.

The kiosk 504 may include and/or communicate (e.g., via a wired connection) with a wireless base station or access point (AP) 516. The AP 516 wirelessly transmits the audio and video data corresponding to the content received, demodulated, decoded, and/or decrypted by the kiosk 504 to mobile devices 520-1, 520-2, . . . , and 520-n (referred to collectively as mobile devices 520). In embodiments, the user may directly connect the mobile device 520 to the kiosk 504 and/or the AP 516 via a wired connection (e.g., a universal serial bus connection).

For example only, a user of one of the mobile devices 520 may selectively connect to the kiosk 504 via the AP 516 and request access to the live content broadcast by the satellite 508. For example, the mobile device 520-1 may first connect to the AP 516. The AP 516 and/or the kiosk 504 may authenticate the mobile device 520-1 to verify that the user of the mobile device 520-1 is an authorized user (e.g., a subscriber of the service provider corresponding to the satellite 508 and the broadcast live content). For example only, the AP 516 and the mobile device 520-1 may participate in a seed/key exchange, the user may be prompted to enter a password and/or log in to an account associated with the user, etc. Once authorized, the user may select a channel corresponding to the requested content using the mobile device 520-1 and the kiosk 504 transmits the content to the mobile device 520-1.

In embodiments with multiple kiosks 504 in the system 500, the kiosk 504 may be configured to fill gaps in the content caused by the user moving out of a wireless communication range (i.e., a coverage area) of another kiosk (not shown) and into the wireless communication range of the kiosk 504 (e.g., the wireless communication range of the AP 516). For example, when the mobile device 520-1 moves out of the wireless communication range of the other kiosk and into the wireless communication range of the AP 516, the mobile device 520-1 may generate a fill request corresponding to a gap in the received content. For example only, the fill request may correspond to content broadcast between a first time that the mobile device 520-1 moved out of the wireless communication range of the other kiosk and a second time that the mobile device 520-1 moved into the wireless communication range of the AP 516. The kiosk 504 may buffer/store the live broadcast content (e.g., in mass storage or other memory) for responding to fill requests.

Referring now to FIGS. 6A-6C, an example content distribution system 600 configured to provide content to mobile devices using multiple kiosks 604-1 and 604-2 (referred to collectively as kiosks 604) is described. In particular, providing content to a mobile device moving between the kiosk 604-1 and the kiosk 604-2 is described. A satellite 608 broadcasts wireless signals including live broadcast content to respective antennas 612-1 and 612-2 (referred to collectively as antennas 612), which provide the signals to the kiosks 604. The kiosks 604 communicate with (and/or include) respective APs 616-1 and 616-2 (referred to collectively as APs 616). The kiosks 604 are configured to provide content to mobile devices 620-1, 620-2 . . . and 620-n. Although shown with separate antennas 612, in embodiments the system 600 may include a single antenna that provides signals via respective wired connections to multiple kiosks 604.

Referring now to FIG. 6A, the mobile device 620-1 receives live content as broadcast from the satellite 608 and transmitted by the kiosk 604-1 and the AP 616-1. For example only, progress of content as broadcast from the satellite 608 as shown at 624. The content shown at 624 corresponds to content requested for viewing by the mobile device 620-1. For example, the content corresponds to a channel selected by the mobile device 620-1 (e.g., at the kiosk 604-1). Progress of the content as received by the mobile device 620-1 is shown at 628. For example only, the progress of the content showed at 628 may correspond to the content as buffered at the mobile device 620-1. Accordingly, the content received by the mobile device 620-1 corresponds to the same content as broadcast by the satellite 608. However, in some implementations, the content as received by the mobile device 620-1 may be in a different (e.g., transcoded) format.

As shown in FIG. 6A, a same portion of the content broadcast by the satellite 608 has already been received (e.g., buffered) by the mobile device 620-1. However, due to transmission delays and other factors, the portion received by the mobile device 620-1 may be less than the portion of the content already broadcast by the satellite 608.

In FIG. 6A, the mobile device 620-1 is within a wireless communication range 632 of the AP 616-1 corresponding to the kiosk 604-1. Accordingly, the mobile device 620-1 receives the content from the kiosk 604-1 via the AP 616-1.

Referring now to FIG. 6B, the mobile device 620-1 has moved outside of the wireless communication range 632 of the AP 616-1 (and, therefore, a corresponding coverage area of the kiosk 604-1). Accordingly, communication between the mobile device 620-1 and the kiosk 604-1 is interrupted. As shown at 636, progress of the content as broadcast from the satellite 608 has continued (i.e., increased), while progress of the content as received by the mobile device 620-1 from the kiosk 604-1 has discontinued (i.e., remained the same as in FIG. 6A) as shown at 640. Further, the mobile device 620-1 has not yet moved into a wireless communication range 644 of the AP 616-2. Accordingly, the mobile device 620-1 may be referred to as a "roaming" device.

Referring now to FIG. 6C, the mobile device 620-1 has moved into the wireless communication range 644 of the AP 616-2 and the kiosk 604-2. Accordingly, the kiosk 604-2 has resumed transmitting the content to the mobile device 620-1. The progress of the content as broadcast from the satellite 608 is shown at 648. The progress of the content as received by the mobile device 620-1 from each of the kiosks 604 is shown at 652.

In an example implementation, the mobile device 620-1 automatically connects to the kiosk 604-2 via the AP 616-2 upon entering the wireless communication range 644 and requests content from the same channel as requested from the kiosk 604-1. For example, authorization of the mobile device 620-1 as performed by the kiosk 604-1 may be preserved for automatic authorization by the kiosk 604-2. Alternatively, the user and mobile device 620-1 may require re-authentication by the kiosk 604-2 as described above in FIG. 5. Once authenticated, the mobile device 620-1 may automatically request content from the same channel that was previously being provided by the kiosk 604-1. For example, the mobile device 620-1 may store identifiers of the particular content and/or the particular channel corresponding to the requested content and provide the identifiers to the kiosk 604-2.

In embodiments, each of the kiosks 604 may store information associated with the user (e.g., in a profile manager module 444 as shown in FIG. 4). The kiosks 604 may share the information (or have access to a common storage location of the information, such as the head end 12). The information may include a last (i.e., most recent) channel or content requested by the user. Accordingly, the kiosk 604-2 may automatically resume providing the content upon re-authenticating the mobile device 620-1.

The mobile device 620-1 may also generate a fill request corresponding to gaps in the content caused by the interrupted connection between the mobile device 620-1 and the kiosks 604. The fill request may include information about the request channel and/or content and the gaps in the content. For example only, the fill request may include information including, but not limited to, an identifier of the requested content, an identifier of the channel corresponding to the requested content, a first time that delivery of the content to the mobile device 620-1 was interrupted, and a second time that delivery of the content to the mobile device 620-1 resumed. The first and second times may correspond to, for example, a real time clock or a counter value associated with the progress of the broadcast content.

The kiosk 604-2 is configured to fill the gap in the content corresponding to the fill request. For example, the kiosk 604-2 stores/buffers the content received from the satellite 608 and provides a portion of the content corresponding to the fill request to the mobile device 620-1 prior to resuming real time (e.g., live) transmission of the requested content to the mobile device 620-1. Accordingly, the content as received by the mobile device 620-1 includes a first portion of content 656 provided by the kiosk 604-1, a second portion of content 660 provided by the kiosk 604-2 in response to the fill request, and a third portion of content 664 corresponding to content provided by the kiosk 604-2 when real time transmission resumes.

The second portion of the content 660 provided in response to the fill request may be provided in a different format to minimize delays in resuming live broadcast to the mobile device 620-1 and minimize the load on the kiosk 604-2. For example, the kiosk 604-2 may transcode the second portion of the content 660 to a lower quality, resolution, etc. to minimize a size of the second portion of the content 660.

Further, the response to the kiosk 604-2 to the fill request may vary based on one or more other factors. For example, other factors that may be considered by the kiosk 604-2 include, but are not limited to, a number of other mobile devices that the kiosk 604-2 is providing content to, a length of time of the gap in content, and/or a present viewing location of the content by the user with respect to the gap in content.

In embodiments, the fill request may be generated upon interruption of transmission of the content to the mobile device 620-1 from the kiosk 604-1 and prior to connection of the mobile device 620-1 to the kiosk 604-2. For example, the fill request may be automatically filled by another source of the content, including, but not limited to, a cellular network (e.g., a 3G or 4G cellular network). Accordingly, the mobile device 620-1 may not experience an interruption in content while moving between coverage areas of the respective kiosks 604.

Referring now to FIG. 7, an example kiosk 700 according to the principles of the present disclosure is shown. The kiosk 700 includes tuners 704-1, 704-2 . . . and 704-$n$ (referred to collectively as tuners 704) that provide signals corresponding to respective selected channels of a broadcast wireless signal received by antenna 708. Respective demodulators 712-1, 712-2 . . . and 712-$n$ (referred to collectively as demodulators 712) receive and demodulate the respective signals.

The kiosk 700 includes a processor 716. For example, the processor 716 corresponds to a special purpose processor configured to perform functions including, but not limited to, handling client connections (i.e., connections to mobile devices), authentication/authorization of mobile devices, controlling content broadcasting, servicing fill requests, controlling the tuners 704 and demodulators 712, controlling incoming transport data streams, and/or communicating over the internet 720 or other communication network via a wired network interface module 724 and/or a wireless network interface module 728. The kiosk 700 also communicates with, for example, another kiosk 732 and/or one or more mobile devices 736 via the wireless network interface module 728. For example only, the wireless network interface module 728 may correspond to an access point as described in FIGS. 5 and 6.

The kiosk 700 further includes memory 740, conditional access (CA) module 744, transcoder module 748, mass storage 752, and an encryption module 756. The memory 740 provides volatile memory functionality (e.g., random access memory) for executing code, buffering for data transfers to and from the kiosk 700, etc. The conditional access module 744 may provide decryption functionality for decrypting encrypted signals received by the antenna 708. The transcoder module 748 transcodes and/or otherwise modifies content (e.g., modifies resolution, bitrate, encoding format, etc. of the content) for transmission to the mobile devices 736. The mass storage 752 stores/buffers data corresponding to broadcast content received via the respective tuners 704. The encryption module 756 encrypts data corresponding to content transmitted to the mobile devices 736. Accordingly, the mobile devices 736 may receive a decryption key for decryption of the received content upon authentication by the kiosk 700.

Referring now to FIG. 8, an example authentication method 800 according to the principles of the present disclosure begins at 804. At 808, a request for authorization is received. For example, a mobile device connects to an access point of a kiosk and requests content, and an associated request for authorization is received at the access point and/or kiosk. At 812, the method 800 verifies information associated with the mobile device and a corresponding user. For example, the kiosk and/or access point may initiate a challenge/response sequence (e.g., a seed/key verification) with the mobile device. At 816, the method 800 determines whether the mobile device is authorized to access the kiosk. For example, the kiosk may compare the information associated with the mobile device to a blacklist (e.g., a database of unauthorized mobile devices/users) and/or a whitelist (e.g., a database of authorized mobile devices/users). If true, the method 800 continues to 820. If false, the method 800 continues to 824.

At 820, the method 800 assigns a session key to the mobile device. For example, the session key may correspond to a decryption key. The mobile device uses the decryption key to decrypt content received from the kiosk. The method 800 ends at 828.

At 824, the method 800 provides information to the mobile device about how to access the kiosk. For example, the mobile device may receive a notification and/or be taken to a web page indicating that the user can purchase a session (e.g., to authorize access to the kiosk for a day or other predetermined period) and/or displaying advertisements for the services provided by the kiosk. At 832, the method 800 determines whether the user purchased a session with the kiosk. If true, the method 800 continues to 820. If false, the method 800 ends at 828.

Referring now to FIG. 9, an example content distribution method 900 according to the principles of the present disclosure begins at 904. At 908, the method 900 configures one or more tuners of a kiosk to selected channels. For example, the selected channels may correspond to channels requested by one or more mobile devices connected to the kiosk. Configuring the tuners may include, for example only, selecting a satellite, frequency, etc. At 912, the method 900 configures one or more respective demodulators associated with the tuners. For example, configuring the demodulators may include, for example only, selecting modulation type, rates, etc. At 916, the method 900 demultiplexes (e.g., performs PID filtering on) incoming transport streams corresponding to the selected channels.

At 920, the method 900 encrypts the transport streams of the selected channels and writes the encrypted streams to mass storage. At 924, the method 900 decrypts the transport streams to remove encryption associated with the satellite broadcast. At 928, the method 900 transcodes content in the transport streams according to parameters associated with respective target mobile devices. At 932, the method 900 encrypts the content according to respective session keys assigned to the mobile devices. At 936, the method 900 transmits the encrypted and transcoded content to the mobile devices. The method 900 ends at 940.

Referring now to FIG. 10, an example fill request method 1000 according to the principles of the present disclosure begins at 1004. At 1008, the method 1000 receives a fill request from a mobile device. At 1012, the method 1000 determines whether the fill request can be met by the kiosk. For example, the method 1000 determines whether the mobile device is authorized, whether the kiosk is storing (e.g., in mass storage) the content corresponding to the fill request, etc. If true, the method 1000 continues to 1016. If false, the method 1000 ends at 1020.

At 1016, the method 1000 reads (e.g., from mass storage) the content corresponding to the fill request. For example, the method 1000 retrieves the content based on a start time, end time, selected channel, etc. indicated by the fill request. At 1024, the method 1000 transcodes the content according to parameters associated with the mobile device. At 1028, the method 1000 encrypts the content according to a session key assigned to the mobile device. At 1032, the method 1000 transmits the encrypted and transcoded content to the mobile device and ends at 1020.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system, comprising:
 a first kiosk that receives signals broadcast from a service provider;
 a wireless interface that receives, from a mobile device, a request for first content included in the signals received by the first kiosk, wherein the first content corresponds to a first channel,
 wherein the first kiosk includes
  a plurality of tuners, wherein the first kiosk tunes a first tuner of the plurality of tuners to the first channel and the first tuner outputs the first content,
  wherein the first kiosk provides the first content to the wireless interface, and
  wherein the wireless interface transmits the first content to the mobile device; and
 a second kiosk that receives a fill request from the mobile device in response to the mobile device moving out of a first communication range of the first kiosk and within a second communication range of the second kiosk, wherein the fill request identifies the first content and a gap between a first time that the mobile device stopped receiving the first content from the first kiosk and a second time that the mobile device moved within the second communication range of the second kiosk; and
 the second kiosk provides, to the mobile device in response to the fill request, a portion of the first content corresponding to the gap.

2. The system of claim 1, wherein the request for the first content received from the mobile device includes a request for authorization of the mobile device.

3. The system of claim 1, wherein the first kiosk includes a plurality of demodulators, and wherein each of the plurality of demodulators is associated with a respective one of the plurality of tuners.

4. The system of claim 1, wherein, to receive the signals broadcast from the service provider, the first kiosk is in communication with at least one of (i) a satellite antenna that receives the signals from a satellite associated with the service provider and (ii) a wired or wireless network interface that receives the signals from a distributed communications network.

5. The system of claim 1, wherein, prior to providing the first content to the wireless interface, the first kiosk transcodes the first content based on parameters associated with the mobile device.

6. The system of claim 1, wherein, prior to providing the first content to the wireless interface, the first kiosk encrypts the first content, and wherein the first kiosk provides a session key to be used by the mobile device to decrypt the encrypted first content.

7. The system of claim 1, wherein, to provide the portion of the first content corresponding to the gap, the second kiosk determines whether the second kiosk is capable of providing the portion of the first content corresponding to the gap.

8. The system of claim 7, wherein, to determine whether the second kiosk is capable of providing the portion of the first content corresponding to the gap, the second kiosk determines, based on information in the fill request, whether the portion of the first content corresponding to the gap is located within the second kiosk.

9. A method, comprising:
 receiving, at a first kiosk, signals broadcast from a service provider;
 receiving, from a mobile device, a request for first content included in the signals received by the first kiosk, wherein the first content corresponds to a first channel;
 tuning a first tuner of a plurality of tuners of the first kiosk to the first channel;

outputting the first content from the tuner;

transmitting the first content from the first kiosk to the mobile device;

at a second kiosk, receiving a fill request from the mobile device in response to the mobile device moving out of a first communication range of the first kiosk and within a second communication range of the second kiosk, wherein the fill request identifies the first content and a gap between a first time that the mobile device stopped receiving the first content from the first kiosk and a second time that the mobile device moved within the second communication range of the second kiosk; and providing, from the second kiosk to the mobile device in response to the fill request, a portion of the first content corresponding to the gap.

10. The method of claim 9, wherein the request for the first content received from the mobile device includes a request for authorization of the mobile device.

11. The method of claim 9, further comprising demodulating, using a plurality of demodulators associated with the plurality of tuners, respective outputs of the plurality of tuners.

12. The method of claim 9, wherein receiving the signals from the service provider includes receiving the signals from at least one of (i) a satellite associated with the service provider and (ii) a distributed communications network.

13. The method of claim 9, further comprising, prior to providing the first content to the mobile device, transcoding the first content based on parameters associated with the mobile device.

14. The method of claim 9, further comprising, prior to providing the first content to the mobile device, encrypting the first content, wherein the first kiosk provides a session key to be used by the mobile device to decrypt the encrypted first content.

15. The method of claim 9, wherein providing the portion of the first content corresponding to the gap includes determining whether the second kiosk is capable of providing the portion of the first content corresponding to the gap.

16. The method of claim 15, wherein determining whether the second kiosk is capable of providing the portion of the first content corresponding to the gap includes determining, based on information in the fill request, whether the portion of the first content corresponding to the gap is located within the second kiosk.

* * * * *